US010182551B2

(12) United States Patent
Sage, Jr.

(10) Patent No.: US 10,182,551 B2
(45) Date of Patent: Jan. 22, 2019

(54) SIFTING LITTER BOX

(71) Applicant: James R. Sage, Jr., North Huntingdon, PA (US)

(72) Inventor: James R. Sage, Jr., North Huntingdon, PA (US)

(73) Assignee: James R. Sage, Jr., North Huntingdon, PA (US)

( * ) Notice: Subject to any disclaimer, the term of this patent is extended or adjusted under 35 U.S.C. 154(b) by 0 days.

(21) Appl. No.: 15/451,143

(22) Filed: Mar. 6, 2017

(65) Prior Publication Data
US 2017/0251627 A1 Sep. 7, 2017

Related U.S. Application Data

(60) Provisional application No. 62/304,204, filed on Mar. 5, 2016.

(51) Int. Cl.
*A01K 1/00* (2006.01)
*A01K 1/01* (2006.01)
*B07B 1/02* (2006.01)

(52) U.S. Cl.
CPC .............. *A01K 1/0114* (2013.01); *B07B 1/02* (2013.01)

(58) Field of Classification Search
CPC ...... A01K 1/0114; A01K 1/0125; B07B 1/02; B07B 1/08; B07B 1/50
USPC ......... 119/165, 166; 209/259, 370, 373, 374
See application file for complete search history.

(56) References Cited

U.S. PATENT DOCUMENTS

| 5,178,099 A * | 1/1993 | Lapps ................. A01K 1/0114 119/161 |
| 5,402,751 A * | 4/1995 | De La Chevrotiere ..................... A01K 1/0114 119/166 |
| 5,507,252 A * | 4/1996 | Ebert ................... A01K 1/0114 119/166 |
| 5,622,140 A * | 4/1997 | McIlnay-Moe ...... A01K 1/0114 119/166 |
| 5,911,194 A * | 6/1999 | Pierson, Jr. .......... A01K 1/0114 119/166 |
| 6,095,088 A * | 8/2000 | Savicki ................ A01K 1/0114 119/166 |
| 6,494,165 B2 * | 12/2002 | Asbury ................ A01K 1/0114 119/165 |
| 7,198,006 B2 * | 4/2007 | Fischer ................ A01K 1/0114 119/166 |

(Continued)

OTHER PUBLICATIONS

Cyberbrands International, Cyberbrands.com, Quick Sand Litter Box, (Nov. 11, 2017), Torrance, CA, US, available at http://www.cyberbrands.com/pub/qsand2.html.

(Continued)

*Primary Examiner* — Joseph C Rodriguez
(74) *Attorney, Agent, or Firm* — San Diego IP Law Group LLP; Trevor Coddington

(57) ABSTRACT

A fast and simple to use sifting litter box is provided. In an embodiment of the invention, the sifting litter box comprises two litter box trays oriented at a right angle with a screen placed in between the trays. Rotating the sifting litter box ninety degrees allows unused litter to sift through the screen while trapping clumped litter. The clumped litter can be discarded by removing the screen. Afterward, simply replace the screen back into the sifting litter box for the next cleaning cycle.

3 Claims, 12 Drawing Sheets

(56) References Cited

U.S. PATENT DOCUMENTS

| | | | | |
|---|---|---|---|---|
| 7,278,372 | B2* | 10/2007 | Colsky | A01K 1/0114 119/166 |
| 7,293,528 | B2* | 11/2007 | Fairhall | A01K 1/0114 119/165 |
| 7,647,889 | B2* | 1/2010 | Horanoff | A01K 1/0114 119/163 |
| 2011/0088630 | A1* | 4/2011 | Krotts | A01K 1/0114 119/166 |

OTHER PUBLICATIONS

Amazon, Inc., Amazon.com, Lift'n Sift, (Nov. 11, 2017), Seattle, WA, US, available at https://www.amazon.com/Lift-Sift-Litter-Tray-System/dp/B01MT0NX45/ref=sr_1_2?ie=UTF8&qid=1509823885&sr=8-2&keywords=lift+sift+litter+box.

Luuup, Inc., Luuup.com, Luuup Litter Box, (Nov. 11, 2017), Toronto, ON, Canada, available at https://luuup.com/?utm_source=bing&utm_medium=cpc&utm_campaign=Search%20-%20Brand&utm_term=luuup%20litter%20box&utm_content=Litter%20Box%20-%20General.

Omega Paw, Inc., Omegapaw.com, Roll' N Clean Litterbox, (Nov. 11, 2017), St. Marys, ON, Canada, available at http://omegapaw.com/products/roll-clean-litter-box.html.

Petco Animal Supplies, Inc., Petco.com, Van Ness Enclosed Sifting Litter Pan, (Nov. 11, 2017), San Diego, CA, US, available at https://www.petco.com/shop/en/petcostore/product/cat/cat-litter-boxes-and-accessories/sifting-litter-boxes/van-ness-sifting-enclosed-cat-litter-pan.

Petco Animal Supplies, Inc., Petco.com, Hagen Catlt SmartSift Litter Box, (Nov. 11, 2017), San Diego, CA, US, available at https://www.petco.com/shop/en/petcostore/product/cat/cat-litter-boxes-and-accessories/sifting-litter-boxes/hagen-catit-smartsift-litter-box.

Amazon, Inc., Amazon.com, Littermaid Mega Self-Cleaning Litter Box, (Nov. 11, 2017), Seattle, WA, US, available at https://www.amazon.com/Littermaid-LM980-Mega-Self-Cleaning-Litter/dp/B004HGXVOK/ref=sr_1_2?ie=UTF8&qid=1509824307&sr=8-2&keywords=littermaid.

* cited by examiner

SIFTING LITTER BOX

CROSS REFERENCE TO RELATED APPLICATION

This present invention claims priority to U.S. Provisional Patent Application No. 62/304,204, filed on Mar. 5, 2016, and entitled, "Sifting Litter Box with Two Trays Creating a Right Angle," the disclosure of which is incorporated by reference herein in its entirety.

BACKGROUND OF THE INVENTION

1. Field of Invention

The present invention relates to litter boxes and more specifically, to a sifting litter box with two litter box trays.

2. Description of Related Art

Household pets are exceedingly popular, in the United States and throughout the world. It is not uncommon for pet lovers to have more than one pet. One very popular pet is the domestic cat. According to the 2015-16 National Pet Owners Survey by the American Pet Products Association, the cat has surpassed the dog as the "pet of choice." There are an estimated 77.8 million pet dogs and an estimated 85.8 million pet cats in the United States. Although cats are relatively low maintenance, owners who keep their cats indoors are faced with the litter box problem: how to best maintain and clean the box or tray into which the cat urinates and defecates. At best, it is an unpleasant task. And, for pregnant women and individuals with an immune-deficiency, it should be avoided due to risk of contracting toxoplasmosis, a parasite that can be passed to people through contact with feline feces (most litter products display a warning suggesting that pregnant women and immune-deficient patients avoid litter box maintenance).

Pet product manufacturers have introduced products over the years to improve and meet the challenge of the litter box task, but clearly the advent of clumping litter in the mid-1980s is one of the most important. Prior to clumping litter, owners used granulated clay litter, which must be cleaned frequently and offers no odor control. Conversely, clumping litter solidifies wet urine and excrement, and deodorizes solid waste matter better than any other litter product. Clumping cat litter has quickly become the number one selling type of cat litter on the market. Other popular new cat litters are silica- and wood-based, which are clumping and non-clumping.

Although clumping litter is an improvement over other options, the disposal and maintenance problem of such still exists. Several popular clumping litter brands refer to the products as "scoopable," suggesting the use of a scoop to remove the clumped waste from the litter. This method sends the cat owner on unpleasant search missions through the litter.

A need therefore exists for a litter box that reduces a cat owner's involvement in cleaning cat litter.

SUMMARY OF THE INVENTION

The present invention provides a simple and inexpensive sifting litter box, which will automatically, upon a reversal of position, separate the litter from animal excrement. In an embodiment of the invention, the litter box comprises a first litter box tray that is joined to a second litter box tray. In joining the two trays at a substantially right angle, one tray will be oriented horizontally and the other tray will be oriented vertically. Additionally, the litter box comprises a screen that is disposed at the junction point of the two litter box trays and angled at a forty-five (45) degree angle. The screen has a handle for a user to grab when removing animal waste. When animal waste (i.e., clumped litter) is present, the sifting litter box is rotated ninety (90) degrees so that unused litter sifts through the screen while the waste is trapped without falling back into the empty litter box tray. The screen with waste is removed in a simple, tidy, and time-saving manner with a minimum of effort, cleaned, and then reinserted back into the litter box In an embodiment of the invention, a litter box comprises: a first litter box tray; a second litter box tray; and a removable screen disposed between the first litter box tray and the second litter box tray, wherein the removable screen comprises ribs spaced apart in a configuration to permit the passage of unused litter and prevent the passage of clumped litter. The first litter box tray and the second litter box tray are joined at a right angle to one another. The first litter box tray and the second litter box tray comprises a means for securing the first litter box tray to the second litter box tray. The first litter box tray and the second litter box tray each comprise a handle. The first litter box tray and the second litter box tray form a rounded rear section having a constant radius of curvature. The screen comprises a handle and a rim disposed on an edge opposite to the handle. The rim comprises a number of openings.

In another embodiment of the invention, a method of cleaning a litter box including unused litter and clumped litter, comprises the steps of: rotating a litter box, wherein the litter box comprises a first litter box tray, a second litter box tray, and a screen disposed between the first litter box tray and the second litter box tray; and removing the screen. Prior to the step of rotating, the first litter box tray holds unused litter and clumped litter, and the second litter box tray holds no litter. After the step of rotating, the first litter box tray holds no litter, the second litter box tray holds unused litter, and the screen holds clumped litter. The step of rotating the litter box comprises the step of rotating the litter box ninety degrees. The method further comprises the steps of: discarding the clumped litter from the screen; and replacing the screen between the first litter box tray and the second litter box tray.

An advantage to the present invention is it provides a simple, inexpensive manner to eliminate the necessity of hand scooping pet waste out of a litter box. Working with the strengths of clumping litter, by removing the clumps in one easy motion, without scooping, the present invention will reduce the time of the task and keep the user at a more comfortable distance without having to strain. The user does not need to lift the lifter box to sift the litter; all of the litter weight is always sitting on the floor.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
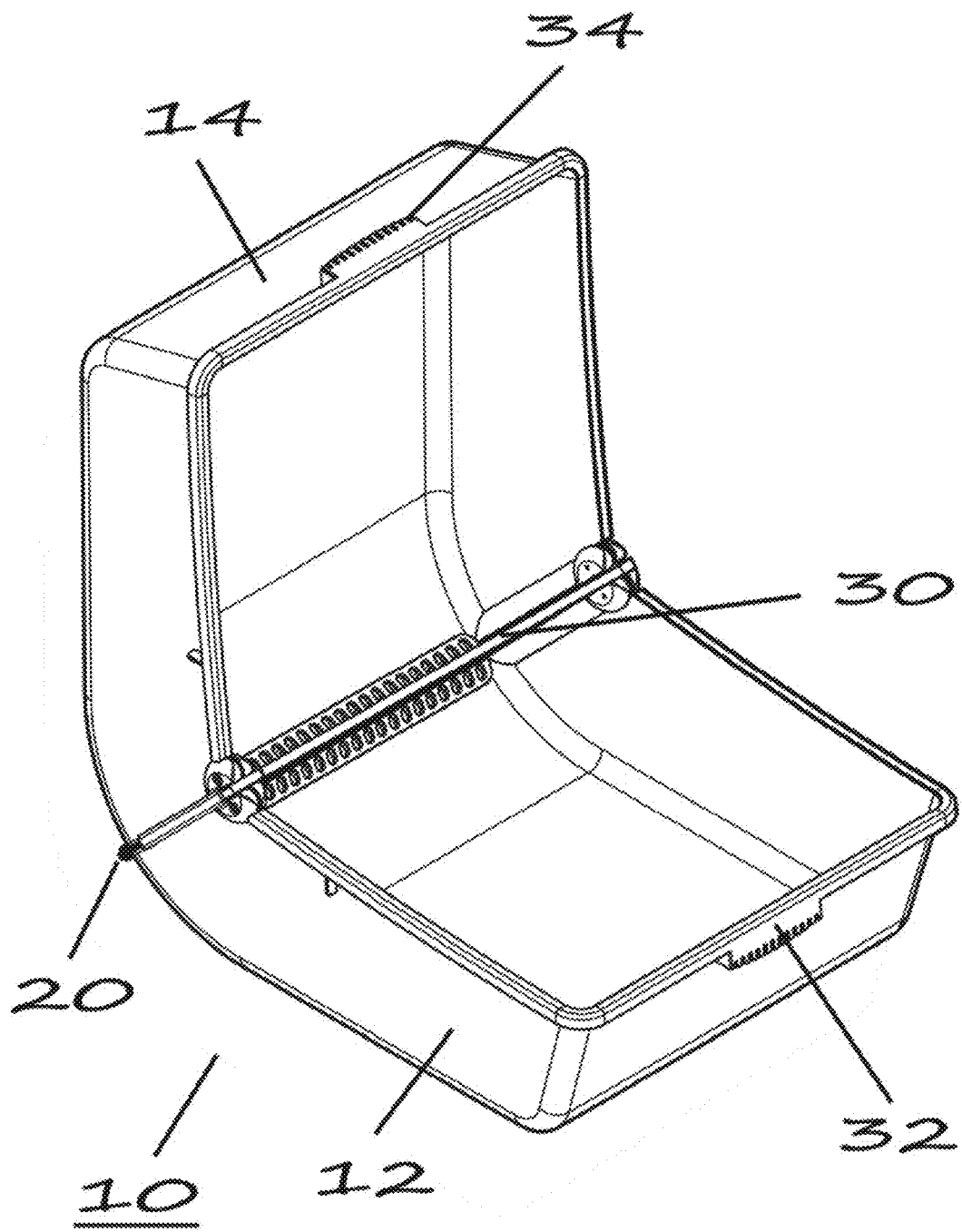
FIG. 1 illustrates a perspective view of a sifting litter box according to an embodiment of the invention.

Further features and advantages of the invention, as well as the structure and operation of various embodiments of the invention, are described in detail below with reference to the accompanying FIGS. 1-12, wherein like reference numerals refer to like elements. Although the present invention is described in the context of a cat litter box, the present invention can be deployed as a litter box for any type of animal capable of being lifter box trained including, but not limited to rabbits, ferrets, dogs, pigs, and birds. As used herein, clumping litter refers to any litter that is designed so that urine and feces can be removed easily from a litter box without having to empty the entire box, i.e., only clumped litter is removed while unused litter remains. Most clumping litter contains bentonite that allows the litter to form a solid clump as the litter absorbs liquid. There also alternative all-natural fibers that clump animal litter tightly, the identification of which is apparent to one of ordinary skill in the art.

Figure 2:
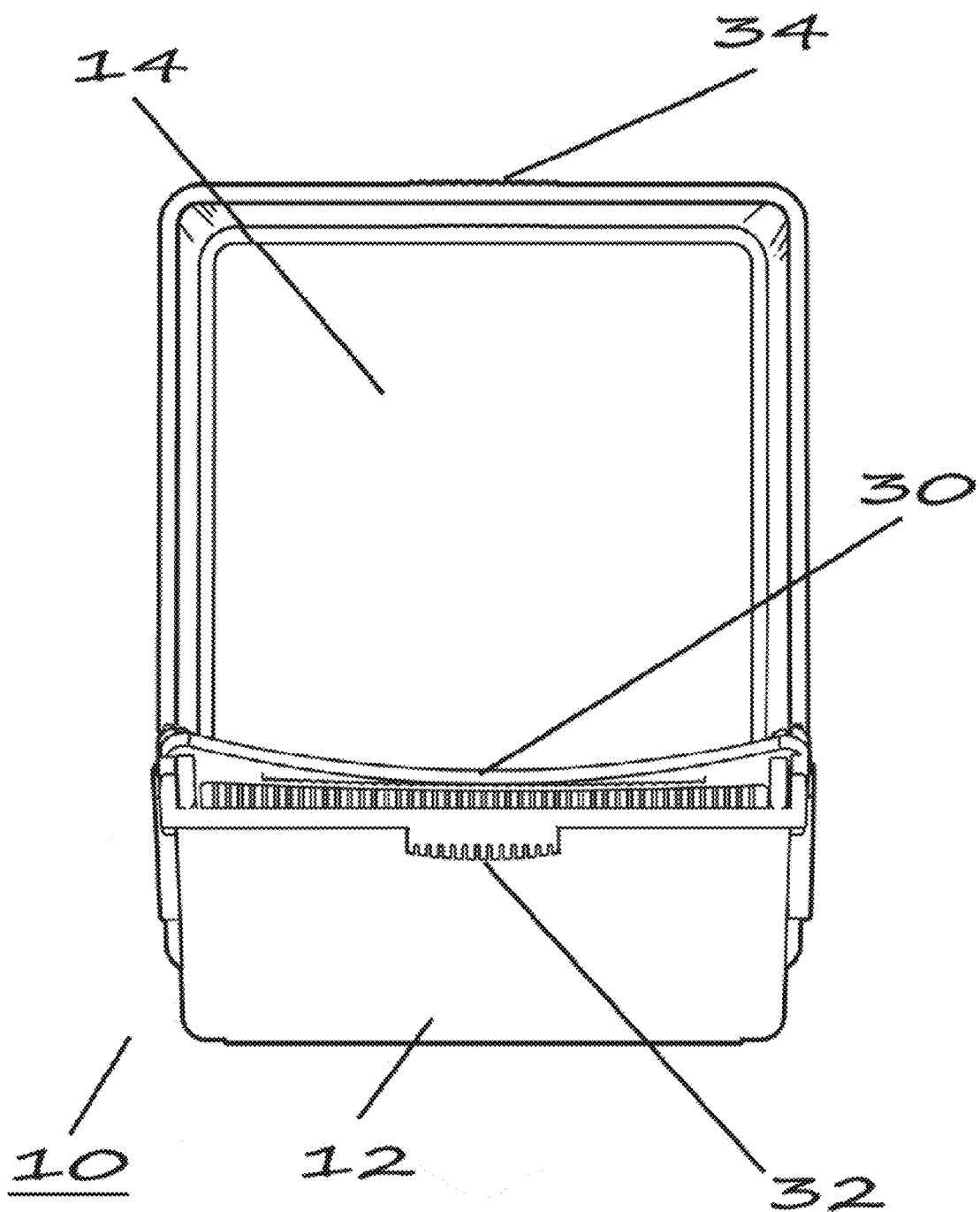
FIG. 2 illustrates a front view of the sifting litter box shown in FIG. 1.
Figure 3:
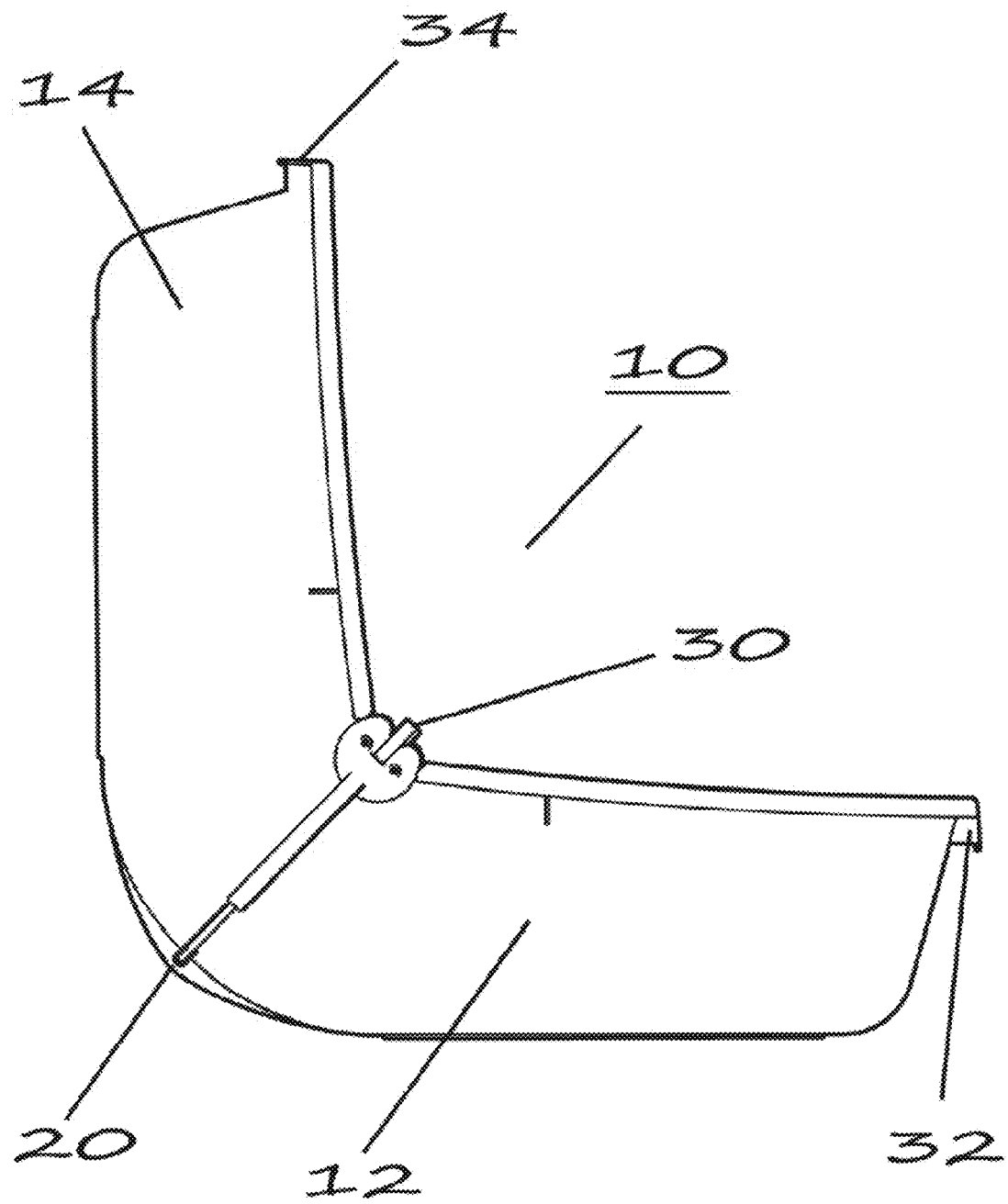
FIG. 3 illustrates a side view of the sifting litter box shown in FIG. 1.

FIGS. 1-3 illustrate various views of a sifting litter box 10 according to an embodiment of the invention. The sifting litter box 10 comprises two litter box trays 12 and 14, and a removable screen 30. The litter box trays 12 and 14 are manufactured from a moldable material such as, but not limited to polypropylene, polystyrene, or resin. Polypropylene is a very strong substance that has the lowest density of plastics used in packaging, and has a high melting point, making it ideal for hot-fill liquids. Polystyrene is a very versatile plastic that can be rigid or foamed and has a relatively low melting point. General purpose polystyrene is clear, hard and brittle. Any of a class of solid or semi-solid organic resins of natural or synthetic origin can be used as well, generally of high molecular weight with no definite melting point. Most resins are polymers. Other rigid materials can be used including, but not limited to thermo-molded plastics, natural materials like wood or bamboo infused resin, or recycled plastics. When the trays 12 and 14 are joined together, the sifting litter box 10 has a relatively large radius of curvature, e.g., sixteen inches (16") at its back corner 20, which allows a user to create a smooth rolling action from a first position (where the litter box tray 12 is horizontal and in contact with a supporting surface) to a second position (where litter box tray 14 is horizontal an in contact with the supporting surface), and vice versa. Each litter box tray 12 or 14 has a built-in handle 32 or 34, respectively, for the user to comfortably grab while rotating between the two litter box positions.

Figure 4:
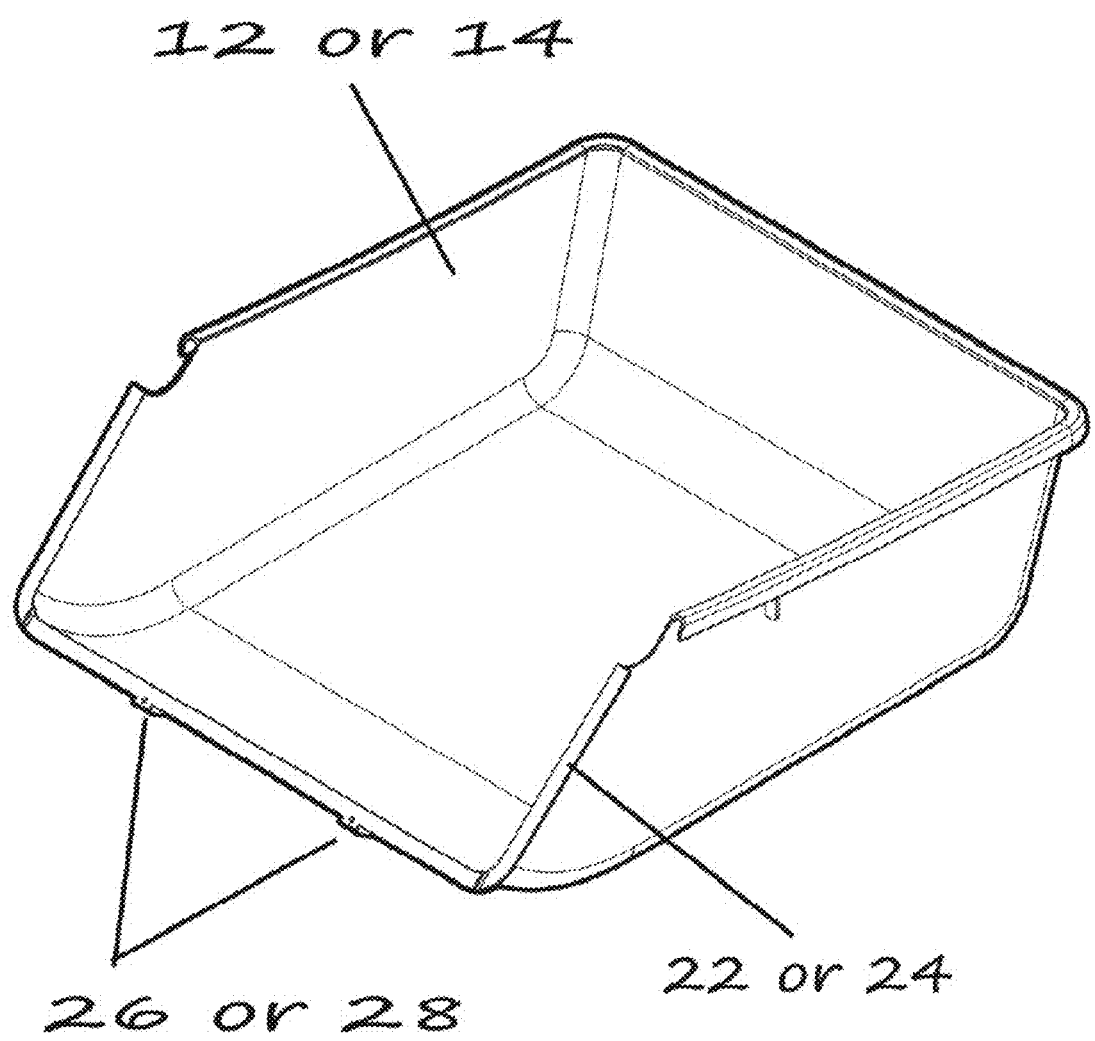
FIG. 4 illustrates a top view of a litter box tray of the sifting litter box shown in FIG. 1.
Figure 5:
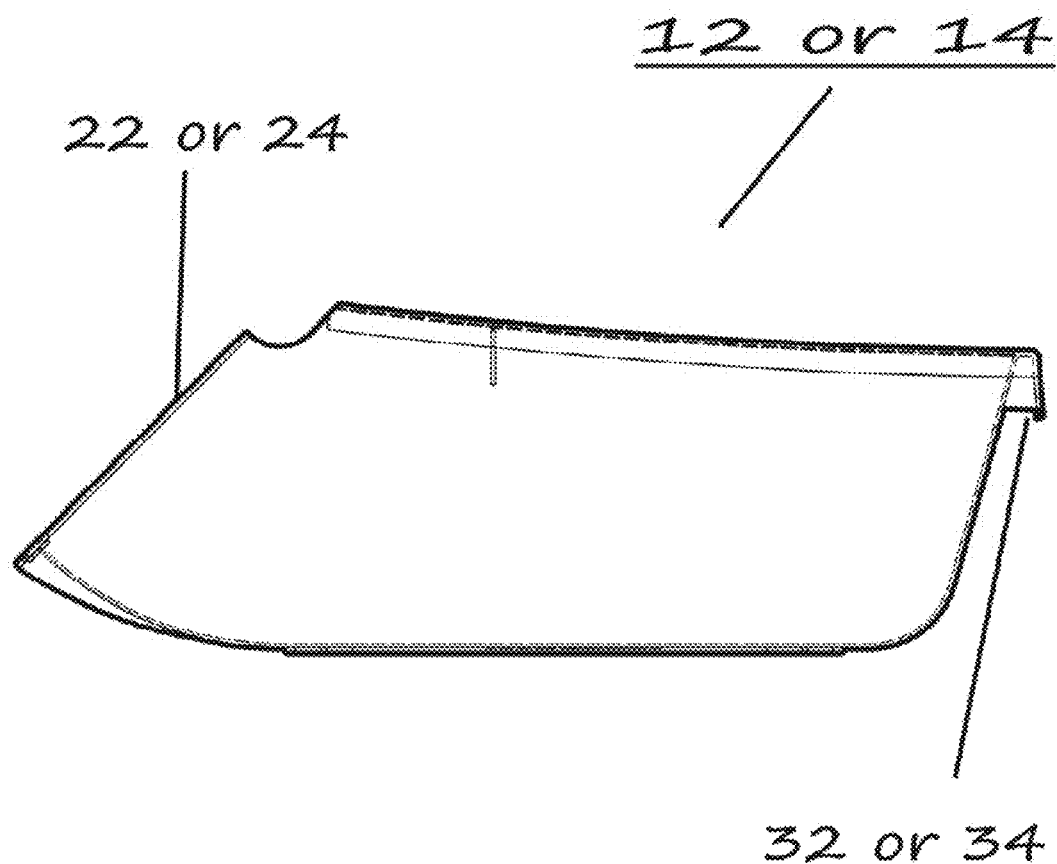
FIG. 5 illustrates a side view of a lifter box tray of the sifting litter box shown in FIG. 1.

Referring to FIGS. 4 and 5, each litter box tray 12 or 14 comprises a rim flange 22 or 24, preferably angled at forty-five (45) degrees, for securing the two litter box trays 12 and 14 together, thus forming a ninety (90) degree or right angle between the trays 12 and 14. In other words, in a first position, the litter box tray 12 is oriented horizontally while the litter box tray 14 is oriented vertically, as shown. Having a vertically oriented tray provides a privacy wall for pets. In less preferred embodiments, the angle of the ridge flanges 22 and 24 can be varied in order to form an obtuse or acute angle between the litter box trays 12 and 14.

Figure 6:
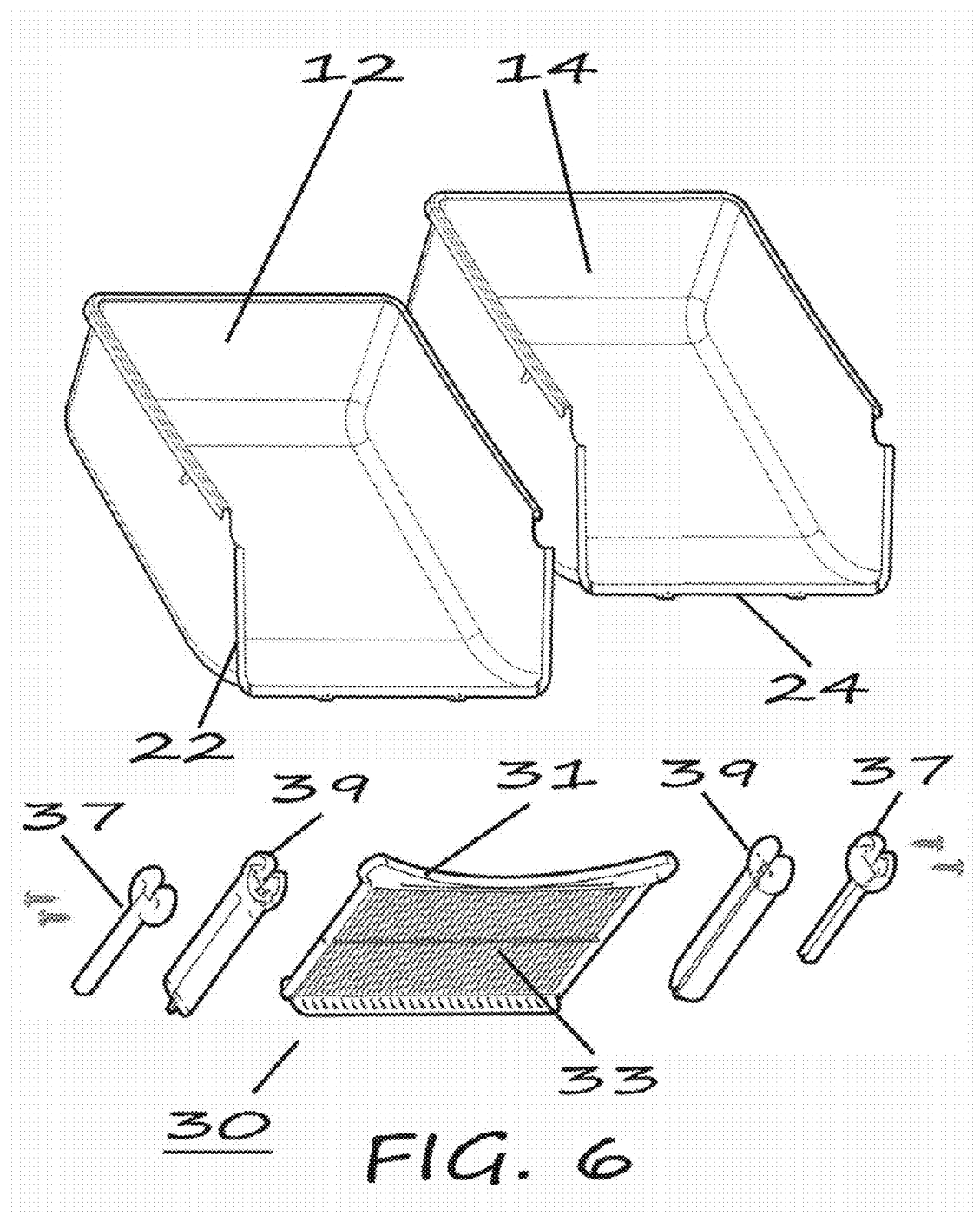
FIG. 6 illustrates a disassembled view of the sifting litter box shown in FIG. 1.

FIG. 6 illustrates a disassembled sifting litter box 10. In an embodiment of the invention, the rim flanges 22 and 24 optionally comprise a plurality of male/female pairs of fasteners such as, but not limited to holes and posts. For example, as shown in FIG. 6, one side of the rim flange 22 or 24 comprises a number of posts 26 and the other side of the rim flange 22 or 24 comprise an equal number of holes 28. When joining the rim flange 22 of litter box tray 12 to the rim flange 24 of litter box tray 14, the holes 28 receive the posts 26. In an exemplary embodiment of the invention, the posts 26 are mushroom posts where a head of each post 26 is slightly larger than its corresponding hole 28. Accordingly, insertion of a post 26 through a hole 28 snaps or locks the respective post 26 in place. Although only two posts 26 or holes 28 are shown, any number can be disposed around flange 22 or 24. In other embodiments of the invention, other types of connectors may be used such as, but not limited to hooks and slots, bolts and nuts, turnbuckles, cotter pins, clips, or snaps, the implementation of which is apparent to one of ordinary skill in the art.

The removable screen 30 permits sifting and separating clumping waste from clean litter. The screen 30 comprises a handle 31 and ribs 33. Ribs 33 are spaced apart in such a way that unused litter can travel through the screen 30, but clumped litter cannot. In another embodiment of the invention, the removable screen 30 comprises any type of sieve for separating clumped litter from unused litter, the identification and implementation of which is apparent to one of ordinary skill in the art, such as a riddle tool, spider utensil, or mesh strainer.

In an embodiment of the invention, the litter box 10 comprises two outer guides 37 and two inner guides 39. One outer guide 37 and one inner 39 is used at each side of the litter box 10 to provide a sliding channel for the screen 30 to slide in and out of the litter box 10. An outer guide 37 provides a channel to fit over the rim flanges 22 and 24. A respective inner guide 39 is fastened to the outer guide 37 via two screws, thereby holding the litter box trays 12 and 14 together. The posts 26 and holes 28 may be additionally used to strengthen the seal between the litter box trays 12 and 14. In an embodiment of the invention, the outer guides 37 and inner guides 39 are polypropylene, polystyrene, a solid or semi-solid organic resin, thermo-molded plastic, a natural materials like wood or bamboo infused resin, or recycled plastics.

Figure 7:
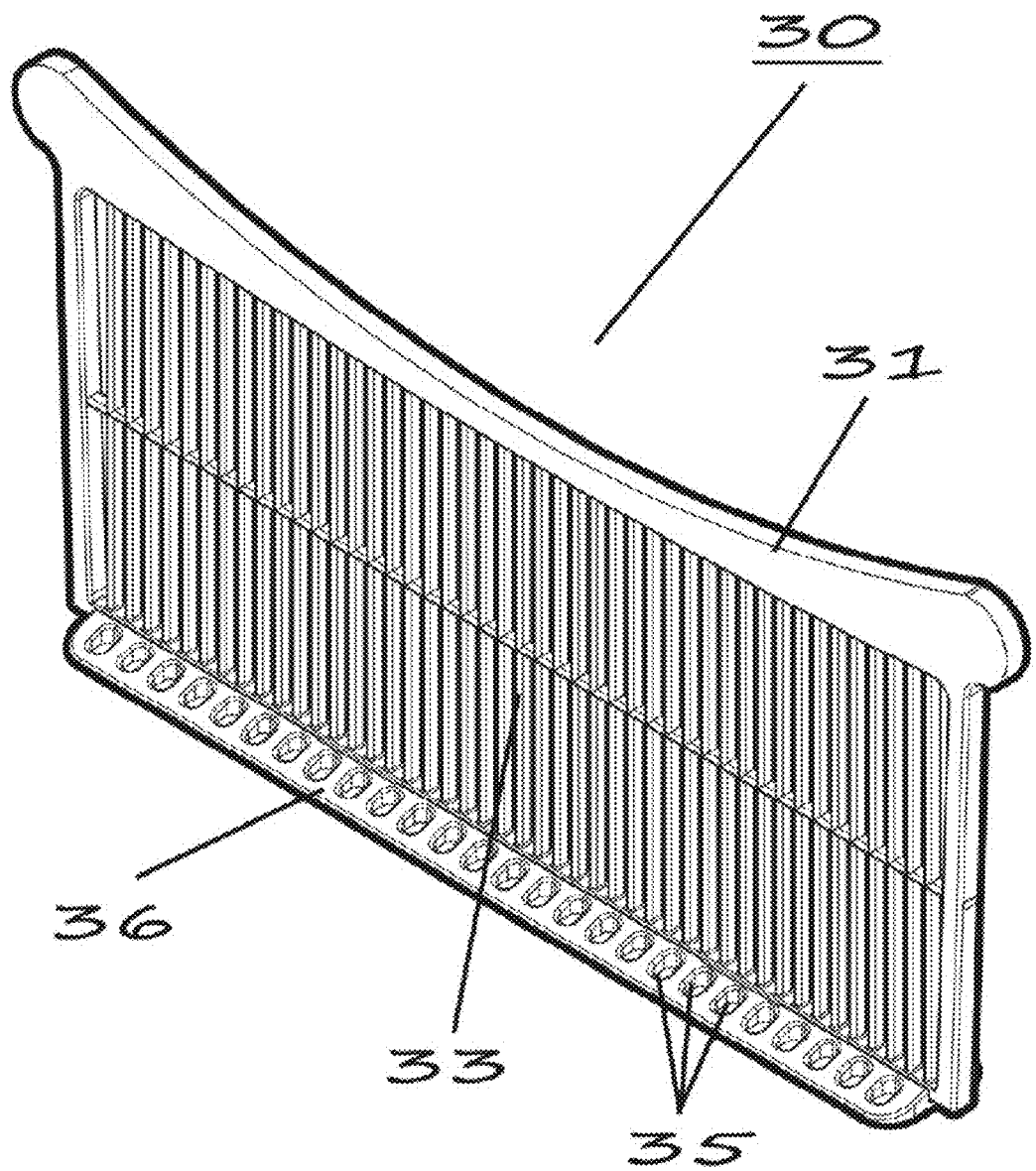
FIG. 7 illustrates a screen of the sifting litter box shown in FIG. 1.

Referring to FIG. 7, a rim 36 is provided on the opposite end of the handle 31. The rim 36 matches the radius of curvature of the back corner 20 or the litter box 10, creating a close fit. The rim 36 is provided on opposite faces of the screen 30. Each rim 36 may optionally include openings 35 to add strength. In an embodiment of the invention, the screen 30 is polypropylene, polystyrene, a solid or semi-solid organic resin, thermo-molded plastic, a natural materials like wood or bamboo infused resin, or recycled plastics.

Alternatively, the screen 30 is metal. The removable screen 30 is easy to clean when removed from the sifting litter box 10. Interior surfaces of the litter box trays 12 and 14 are preferably smooth and free of any corners or protrusions for clumped litter to get stuck.

Figure 8:
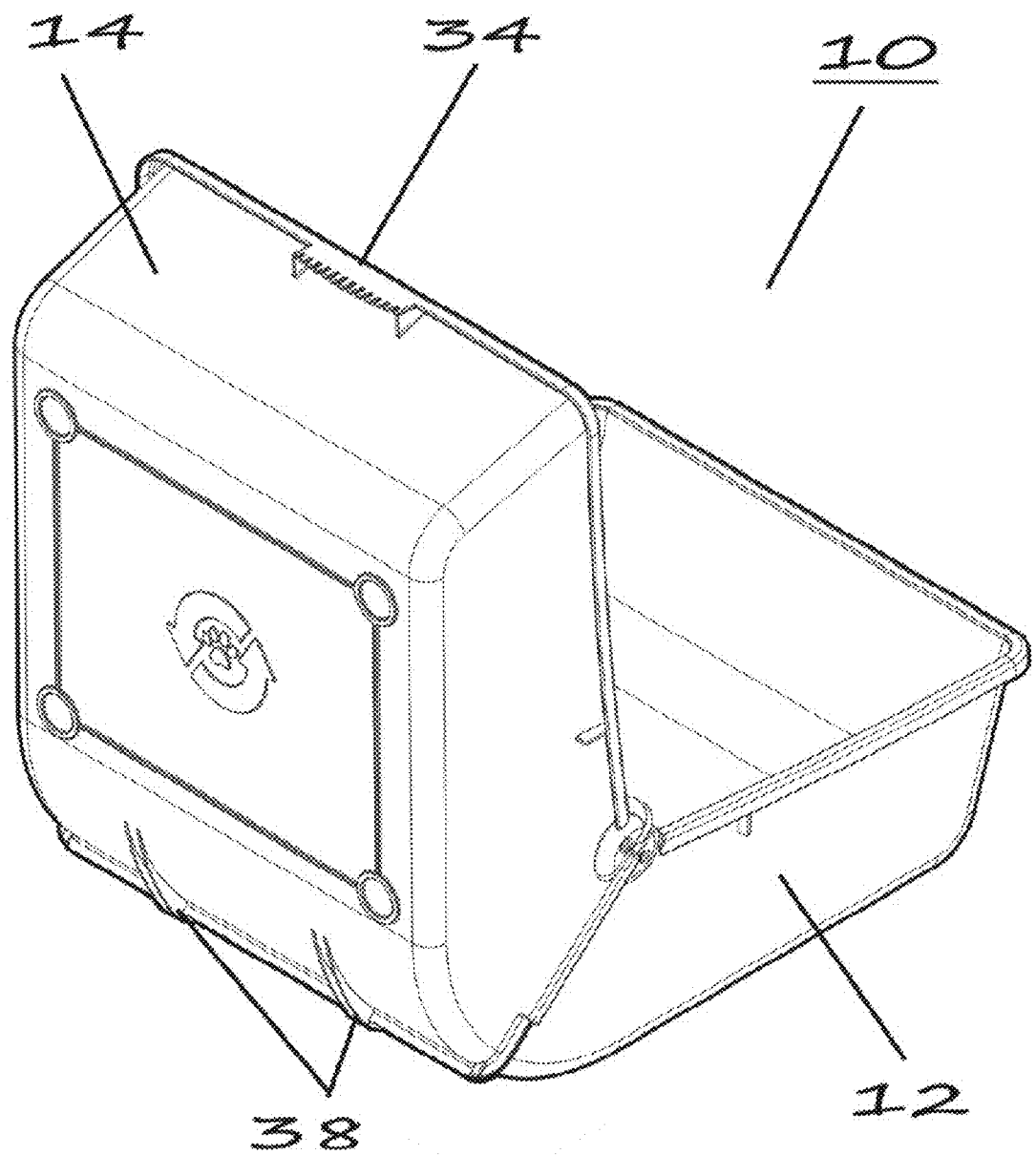
FIG. 8 illustrates a rear perspective view of the sifting litter box shown in FIG. 1.

Referring to FIG. 8, each litter box tray 12 or 14 may include a number of guides 38 to facilitate unencumbered rotation of the litter box 10 during cleaning, as described below.

Figure 9:
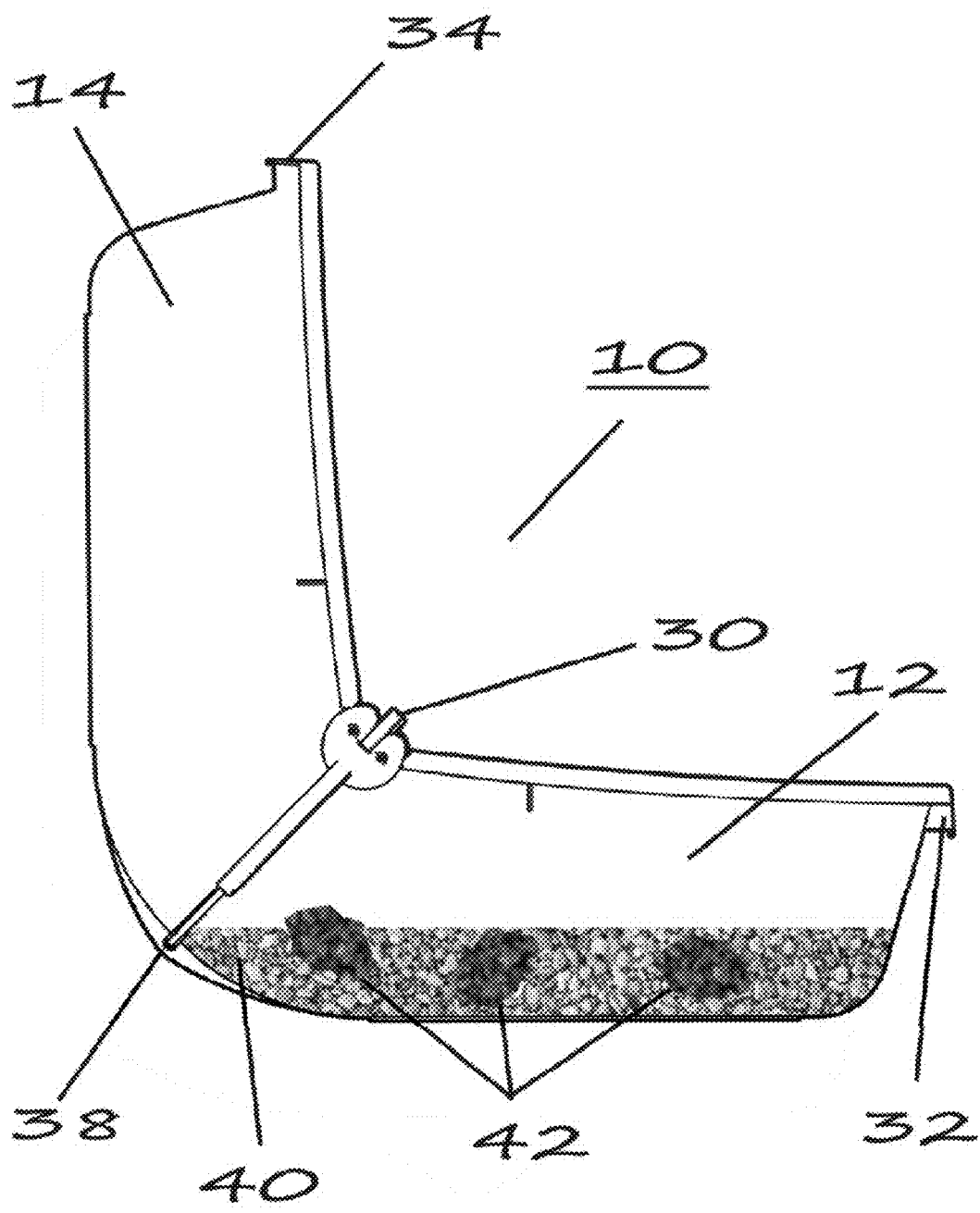
FIG. 9 illustrates the sifting lifter box of FIG. 1 with unused litter and waste.
Figure 10:
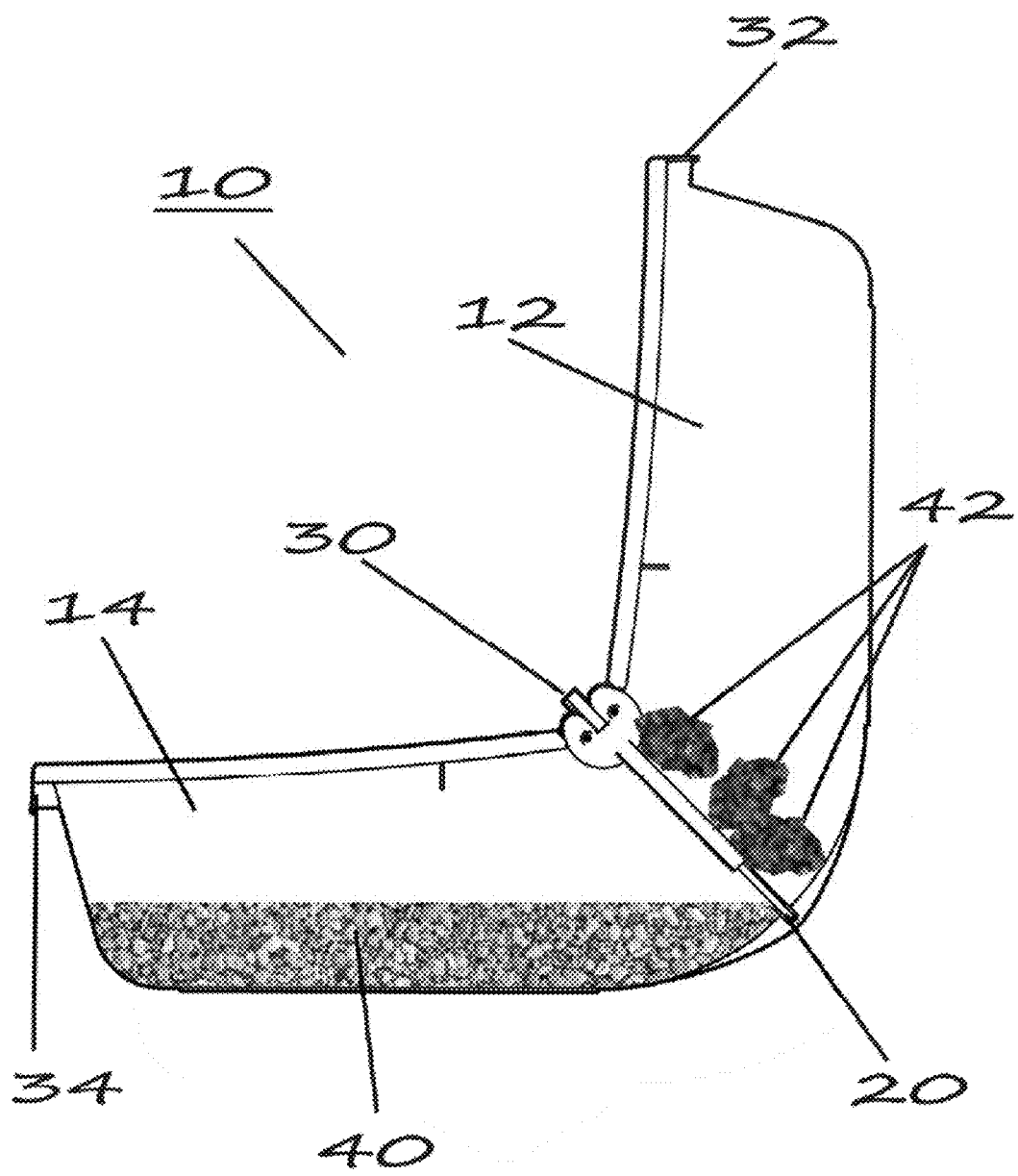
FIG. 10 illustrates the separation of unused litter from waste using the sifting litter box of FIG. 1.

FIG. 9 illustrates the sifting litter box filled with unused litter 40 and waste 42 (i.e., clumped litter). Cleaning waste 42 begins with placing the sifting litter box 10 on a surface such as a floor as shown. Next, if not already in place, the screen 30 is inserted into the sifting litter box 10 through the guides 38 along the rim flanges 22 and 24. The screen 38 rests on the bottom interior of the sifting litter box 10 as shown. Using the handles 32 and 34, the sifting litter box is rotated counter-clockwise ninety (90) degrees. In other words, the litter box tray 14 is moved to a horizontal position, while the litter box tray 12 is moved to a vertical position as shown in FIG. 10. This causes the unused litter 40 to travel through the screen 30 while trapping the clumps and solid waste 42 on the surface of the screen 20. The screen 30 is then removed using the handle 31 to lift the waste 42 away from the litter box 10. After properly disposing the waste 42, the screen 30 is placed back inside the litter box 10. A user never has to lift the litter box 10 to clean it. Over time, it will be necessary to add fresh litter to keep a suitable litter level.

Figure 11:
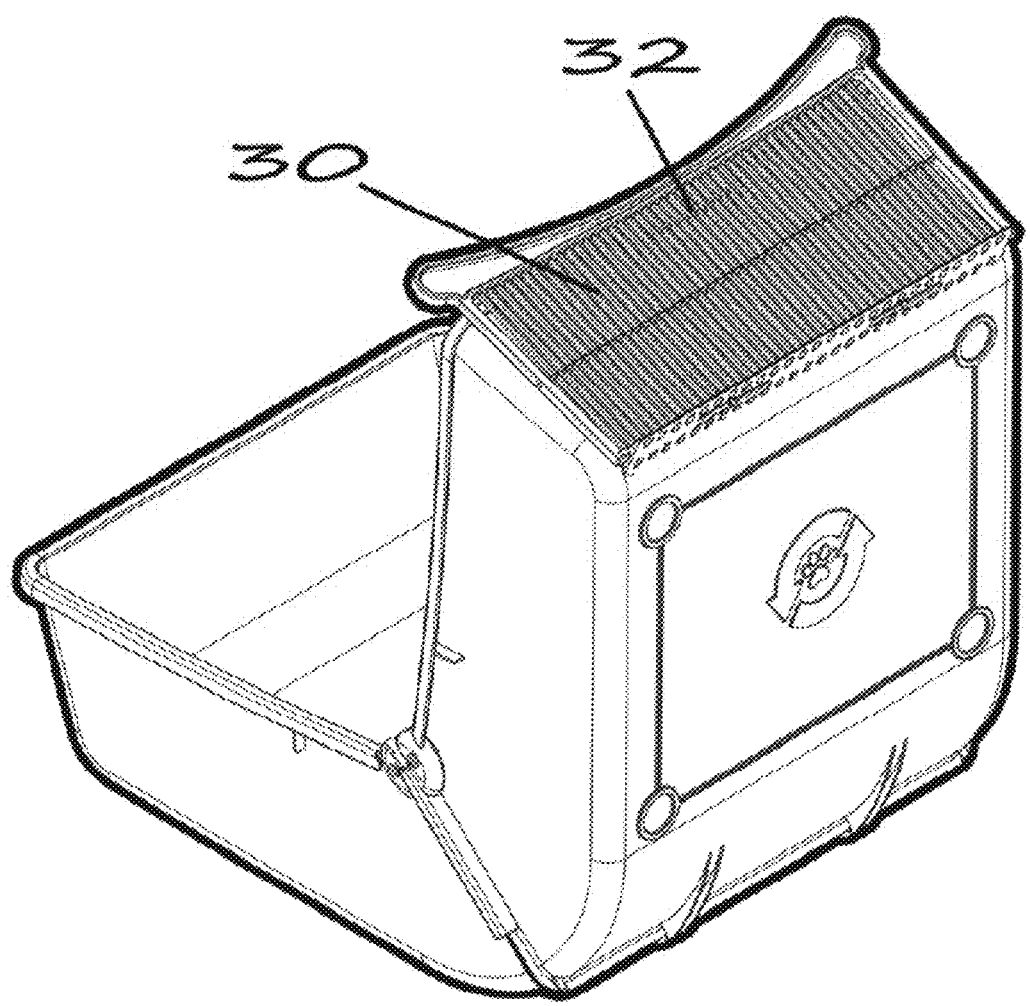
FIG. 11 illustrates a rear perspective view of the sifting litter box of FIG. 1 with the screen toted at a handle.

In an embodiment of the invention, the handle 34 (or the handle 32) comprises grooves that match the spacing of the ribs 33 as shown in FIG. 11. The ribs engage with the handle grooves to stow the screen 30 on top of the litter box 10 if the user chooses to give more interior space for the animal.

Figure 12:
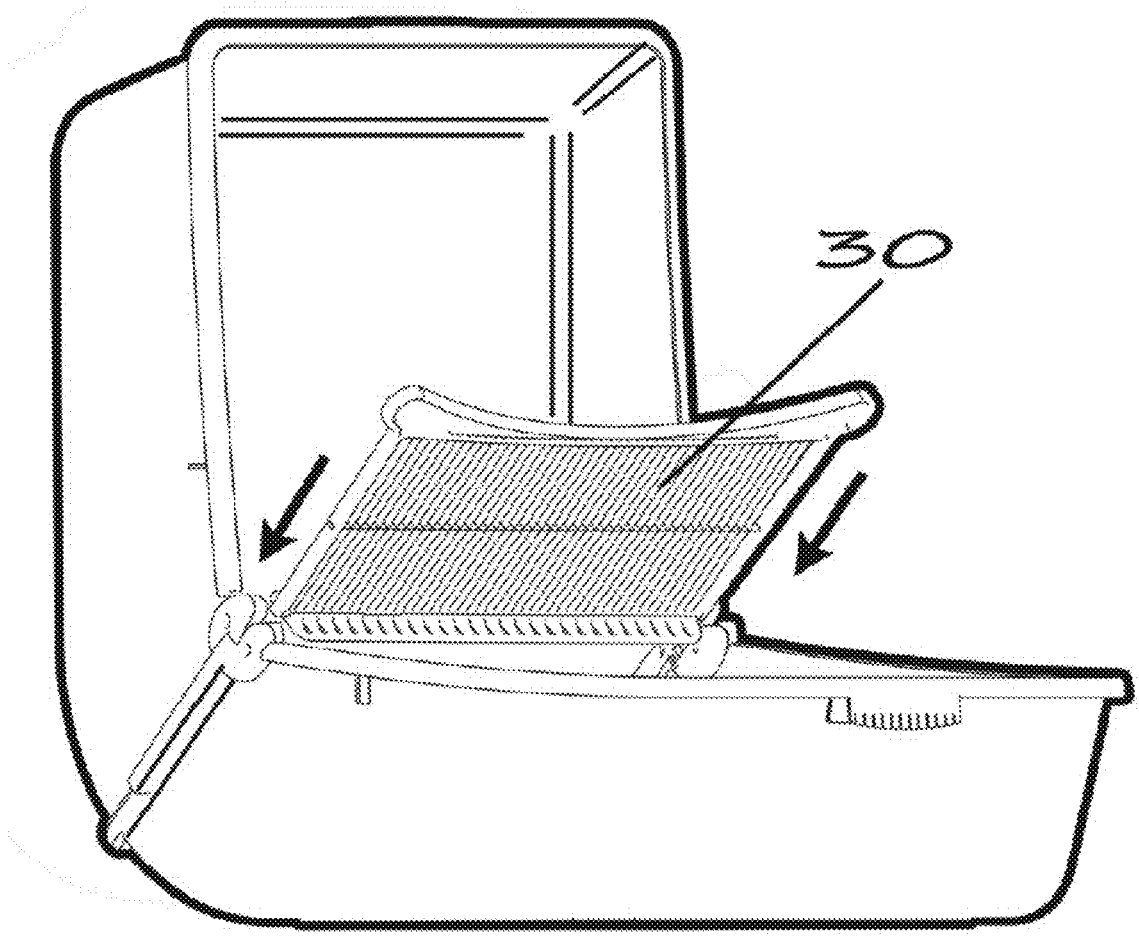
FIG. 12 illustrates insertion of the screen into the sifting litter box of FIG. 1.

FIG. 12 illustrates insertion of the screen into the litter box 10.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method of cleaning a litter box including unused litter and clumped litter, the method comprising the steps of:
   rotating a litter box, wherein the litter box comprises a first litter box tray, a second litter box tray, and a screen disposed between the first litter box tray and the second litter box tray,
   wherein prior to the step of rotating, the first litter box tray holds unused litter and clumped litter, and the second litter box tray holds no litter, and
   wherein after the step of rotating, the first litter box tray holds no litter, the second litter box tray holds unused litter, and the screen holds clumped litter; and
   removing the screen.

2. The method of claim 1, wherein the step of rotating the litter box comprises the step of rotating the litter box ninety degrees.

3. The method of claim 1, further comprising the steps of:
   discarding the clumped litter from the screen; and
   replacing the screen between the first litter box tray and the second litter box tray.

* * * * *